July 24, 1923.                                                    1,463,017
                             L. J. HUNT
       DYNAMO ELECTRIC MACHINE ADAPTED FOR SYNCHRONOUS WORKING
                  Filed April 19, 1921       7 Sheets-Sheet 2
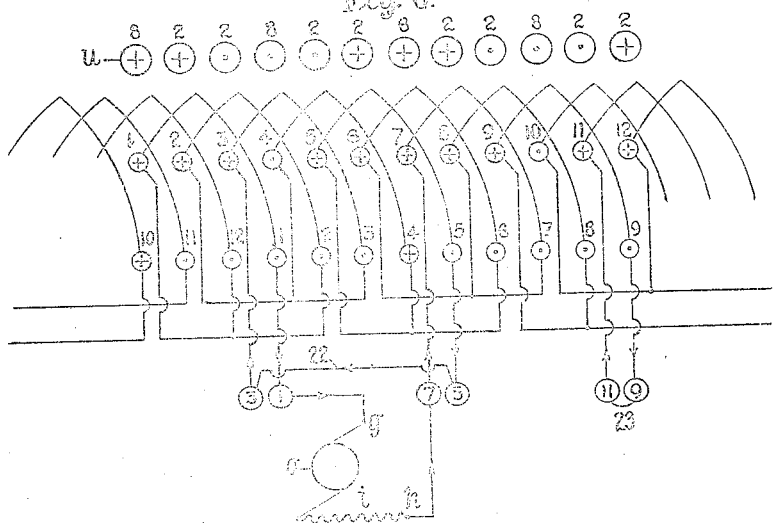
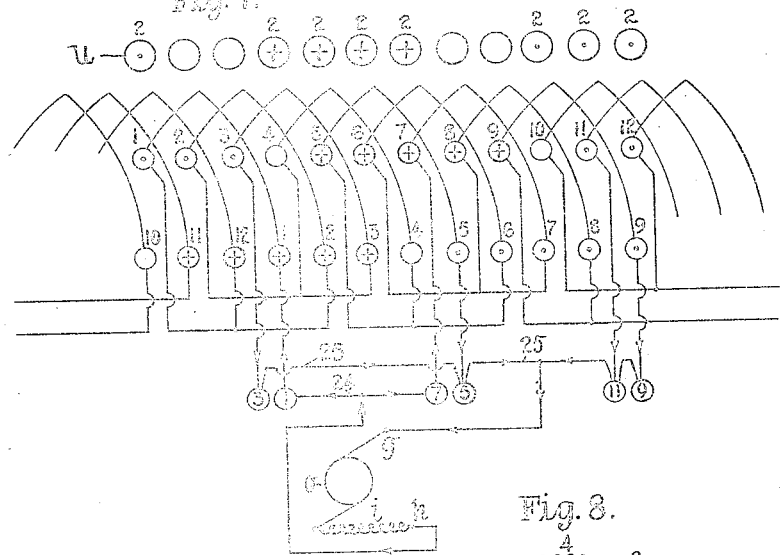
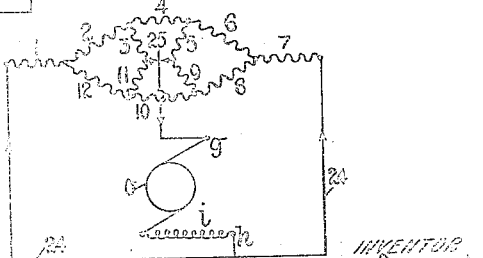

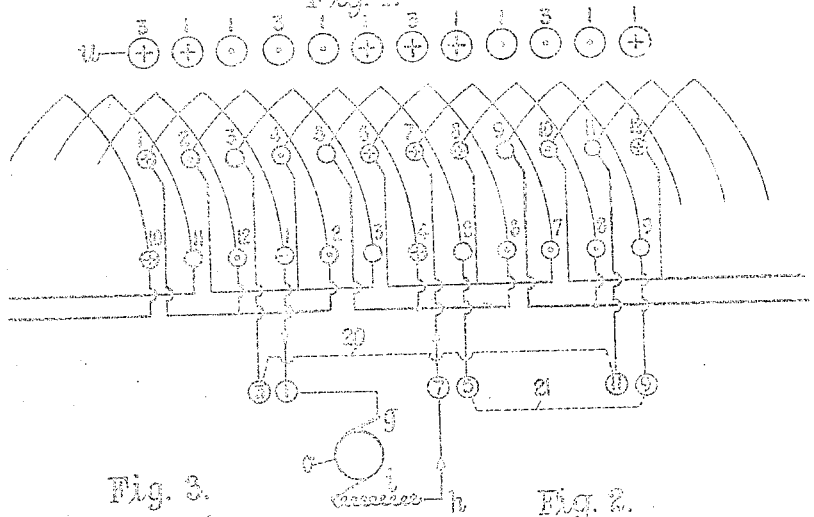
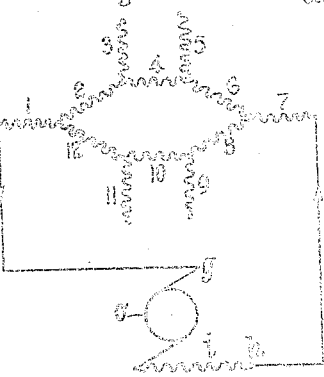
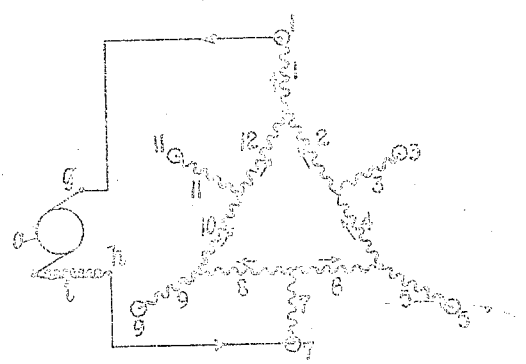
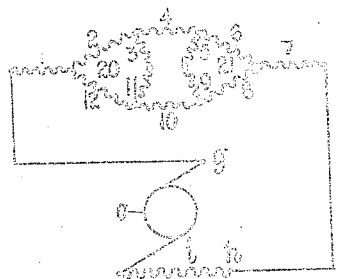
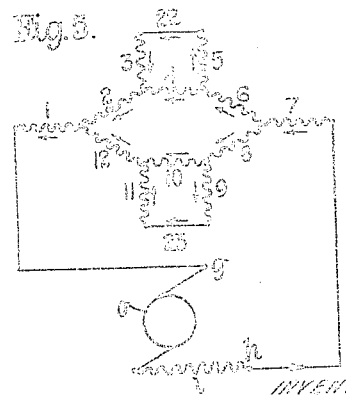

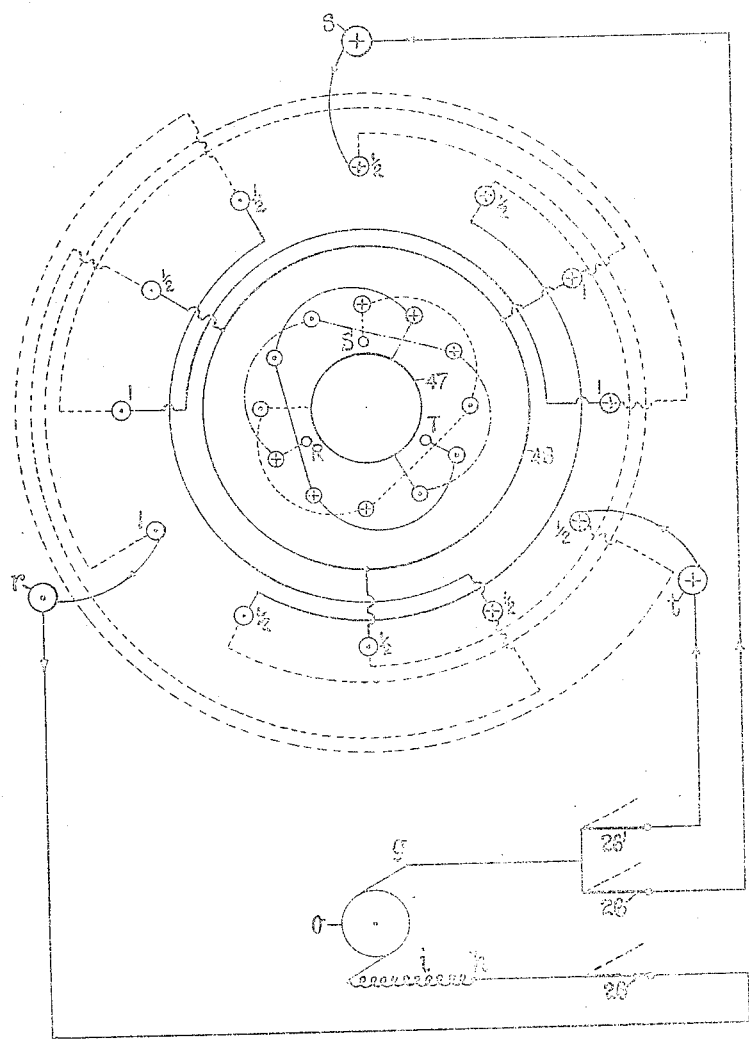

Patented July 24, 1923.

1,463,017

UNITED STATES PATENT OFFICE.

LOUIS JOHN HUNT, OF LONDON, ENGLAND, ASSIGNOR TO GENERAL ELECTRIC COMPANY, OF SCHENECTADY, NEW YORK.

DYNAMO-ELECTRIC MACHINE ADAPTED FOR SYNCHRONOUS WORKING.

Application filed April 19, 1921. Serial No. 462,584.

*To all whom it may concern:*

Be it known that I, LOUIS JOHN HUNT, a subject of the King of Great Britain, and residing at 4 Broad Street Place, London, E. C. 2, England, have invented certain new and useful Improvements in Dynamo-Electric Machines Adapted for Synchronous Working, of which the following is a specification.

This invention relates to dynamo-electric machines adapted for synchronous working, and in certain respects it is a development of the inventions set forth in British patent specification No. 9261 of 1913 or United States patent specification No. 1,160,717, British patent specification No. 24837 of 1914 or United States patent specification No. 1,244,983 and British patent specification No. 124,018 or United States patent specification No. 1,328,520. Windings are used according to this invention of the type set forth for example in reissue specification No. 13,591 as modified in accordance with British patent No. 9261 of 1913, but according to the present invention such windings are used for synchronous working at speeds other than cascade speeds.

The windings in question are of a type made by combining together two windings of different pole numbers so as to obtain a resultant winding having six terminal connections some or all of which lead to slip rings when the winding is applied to a rotor as is usual. In British patent specification No. 9261 of 1913 and the specifications of the later patents referred to above, I have described ways in which such a winding can be made to operate with a stator having windings such as those set forth in British patent specification No. 24838 of 1914 or United States patent specification No. 1,203,347 and British patent specification No. 15113 of 1915, which are suitable for the introduction both of alternating current and direct current giving different pole numbers, so that the machine runs as a synchronous machine at the cascade speed which corresponds to a pole number obtained by adding the two basic pole numbers of the stator and rotor windings.

It is the object of the present invention to provide means whereby such a machine can be run as a synchronous machine at speeds other than the cascade speed. According to the invention direct current is supplied to certain of the terminals of the rotor winding, while other terminals are interconnected for damping purposes, when the machine can be made to run efficiently as a synchronous machine at a speed higher than the cascade speed, corresponding to one or other of the basic pole numbers. Although the invention is useful in enabling a machine of this character to run as a synchronous machine at three different speeds, yet it can also be used in cases where the synchronous cascade speed is not required, and where a synchronous two speed machine having the characteristics obtained with direct current supplied to the rotor windings fulfils particular requirements owing to the synchronizing effects of the local damping circuits. Further, the invention is not limited to motors only as it can be applied to generators, and will enable alternating current to be generated at two or more frequencies with a shaft driven at a constant speed.

The invention is illustrated in the accompanying drawings, wherein, for the sake of simplicity, all of the windings are assumed to have as their basic pole numbers, two poles and four poles, giving a cascade speed equivalent to six poles. It will be understood however that in practice larger basic pole numbers will be used such as 4 and 8 poles, 8 and 12 poles, 12 and 18 poles, 16 and 24 poles, and so forth. In the drawings:—

Figure 1 is a diagram illustrating a rotor winding with six slip rings, and with direct current connections made so as to produce a four-pole field.

Figure 2 is a key diagram corresponding to Figure 1.

Figure 3 is another form of the key diagram.

Figure 4 is a similar diagram to that of Figure 3, showing one method of interconnecting the slip rings for providing damping circuits, that is to say providing paths for the local circulation of currents when the machine tends to go out of phase, which currents will produce a field tending to pull the machine into synchronism again.

Figure 5 is a similar diagram to Figure 4 showing an alternative method of interconnecting the slip rings.

Figure 6 is a diagram showing the winding of Figure 1 with the connections changed to correspond with those of Figure 5, and indicating the flow of the currents under those conditions.

Figure 7 is a diagram of the same winding showing the connections changed to enable a 2-pole field to be produced.

Figure 8 is a key diagram corresponding to Figure 7.

Figure 9 is a diagram illustrating a pair of stator windings which can be used in any case where a machine is required to operate as a synchronous machine at three speeds.

Figure 10:
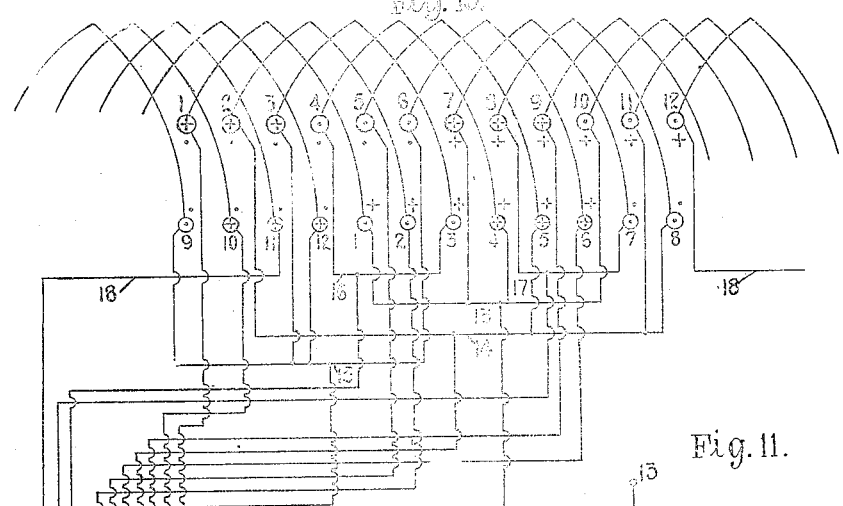
Figure 10 is a diagram of a stator winding and of a change pole switch therefor, adapted for use in any case where only the two basic pole numbers are required to be obtained from the machine.

Referring first to Figure 1, the rotor winding there shown has its coils numbered 1–12, and the slip rings numbered 1, 3, 5, 7, 9 and 11, to correspond with the coils to which they are connected. A source of direct current, for example a direct coupled D. C. generator $o$ is connected between two of the slip rings 1 and 7 leading to opposite points in the winding. The generator is shown as having a series field $i$ its terminal $g$ being connected to slip ring 1, and terminal $h$ to slip rings 7. The current flows as indicated by the arrows, and by the crosses and dots on the bars, so as to produce a 4-pole field. As is seen from the key diagrams, Figures 2 and 3, the current entering at 7 divides into two paths, the one through coils 6, 4, and 2, and the other through coils 8, 10 and 12, uniting again in coil 1. The coils 3, 5, 9 and 11 carry no current. If we assume the strength of current in each parallel path to be unity, twice this unit of current will flow through coils 1 and 7, and on adding up the currents in the respective slots we obtain the resultants indicated by the numbers above the circles in the line $u$ above the diagram, Figure 1. It will be seen that the distribution is symmetrical, and is satisfactory for the purpose in view. If now the winding of the stator of this machine has alternating current supplied to it so as to produce a 4-pole field, the machine will operate as a synchronous motor at 4-pole speed. It is assumed that the stator has windings arranged to produce fields of the two basic pole numbers for which the rotor is designed—in this instance 2 and 4 poles. If the coils 3, 5, 9 and 11 in the rotor winding which carry no current at the synchronous speed, are interconnected in pairs as in Figure 4 for example, and as indicated by dotted lines 20 and 21 in Figure 1, it will be seen that these connections will not interfere with the flow of the current from the generator $o$ because the slip rings 3 and 11, and the slip rings 5 and 9, are equipotential points with respect to the direct current circuit. The connections so completed however provide closed circuits through some of the coils in which currents will be induced owing to the unbalanced fields whenever the machine tends to go out of synchronism, and these currents produce fields tending to pull the rotor into synchronism again. In fact, in a machine having these local circuit paths provided by the interconnection of the slip rings 3 and 11, 5 and 9 as above, no tendency whatever to hunt or to go out of synchronism can be detected.

Figures 5 and 6 show an alternative method of interconnecting the slip rings 3, 5, 9 and 11, so as to provide closed damping circuits, and also to allow of the flow of direct current through their coils. In this case the coils 3 and 5 are connected through suitable switching means at 22, and the coils 9 and 11 are connected at 23, and the flow of currents is as follows:

If the current strength in coils 1 and 7 be taken as 6, the coils 2 and 12, 6 and 8, will each carry currents of the value 3; again, as the conductance of the path through the coil 4 or coil 10 is twice that of the path through the coils 3 and 5, or 9 and 11 forming a parallel connection, the currents in coils 4 and 10 will be of the value 2, while those in coils 3, 5, 9 and 11 will be of the value 1. The currents in coils in some of the slots will neutralize one another in part, but the resultant currents indicated by the values above the circles in the line $u$, Figure 6, give a symmetrically distributed and effective 4-pole field. Rather more current is taken for the same effective field than with the connections made as in Figure 4, owing to the cancellation of the effects in certain of the slots, but the closed damping circuits between coils 3, 4, 5, and coils 9, 10, 11, are rather more effectively disposed than those provided by the connections made at 20 and 21 in Figures 1 and 4.

Referring now to Figures 7 and 8, it will be seen how the connections of the rotor winding are changed when the field corresponding to the other basic pole number, in this example the 2-pole field, is to be produced. The slip rings 1 and 7 are connected together, and to one terminal $h$ of the D. C. generator, by a connection 24, while the other terminal $g$ of the generator leads to a connection 25 joining the remaining four slip rings and coils 3, 5, 9 and 11 in parallel. As the ends of the coils 4 and 10 are equipotential points with respect to the direct current circuit, they carry no current at synchronism, although they form part of the local damping circuits in which currents can flow tending to maintain synchronism. The currents in coils 1 and 7 are of twice the value of those in coils 2, 3, 5, 6, 8, 9, 11 and 12, but as is seen in the diagram Figure 7, the coils 1 and 7 occupy the same slots as coils 4 and 10 which carry no current. In four other slots the currents in the coils add their effects, but in the 2nd, 3rd, 8th and 9th slots the currents oppose and neutralize the effects one of another; the resultant field indicated by the figures above the circles in line $u$, Figure 7, is symmetrically distributed and complies with all practical requirements.

It will thus be seen that a machine having a winding as in Figures 1 to 8 can be made to co-operate with a stator producing rotating fields of 4 poles and 2 poles respectively, so as to run as a synchronous motor at two different speeds, the one twice as fast as the other. If the basic pole numbers were 8 and 12 of course the speed ratios would be 2:3, which corresponds to what is most usually required in practical applications of the invention.

Referring now to Figure 9, it will be seen that this illustrates two windings, the inner one a 4-pole winding with a star connection at 47, and with terminals indicated as receiving alternating current from a three-phase supply R, S, T, while the outer winding is a two-pole winding with a star connection 48, and with terminals $r$, $s$, $t$, through which it is adapted to be excited by direct current. This winding is excited under the conditions indicated by direct current from a source $o$. One terminal $g$ of the source is connected through switches at 26 in parallel to the terminals $s$ and $t$, while the other terminal $h'$ of the source is connected to terminal $r$. The direct currents therefore flow in parallel through two phases of the winding, and out through the third phase, while the value of the current in the first two phases is half of that in the third phase. The resultant values of the currents are indicated by the figures ½ and 1 beside the bars in the winding, and it will be seen that they produce a symmetrically distributed 2-pole field. Pairs of windings such as are shown in Figure 9 may be used on the stator in any case therefore where the machine is required to run at cascade speed, and also at the speeds corresponding to the basic pole numbers.

Figure 11:
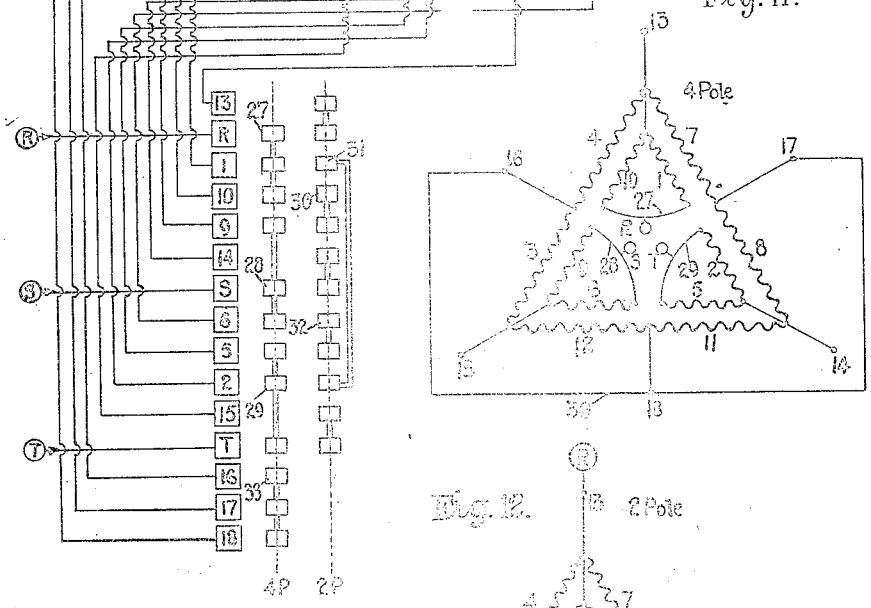
Figure 11 is a key diagram corresponding to Figure 10, showing the connections for producing a 4-pole field.
Figure 12:
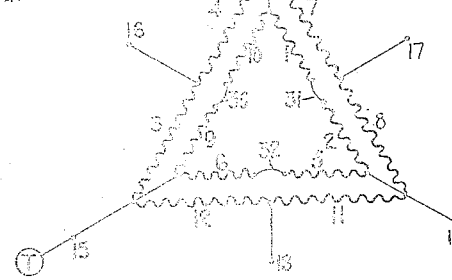
Figure 12 is a key diagram showing how the connections are varied to produce a 2-pole field.

Whenever a machine is required to operate at the speeds corresponding to the two basic pole numbers only, a winding is preferably employed on the stator of the type indicated in Figures 10 to 12. This winding is arranged as a parallel mesh winding, as seen in Figure 12, but the mesh connections are adapted to be opened out and changed to star connections for operation at another pole number, as in Figure 11. The connections of Figure 11 are those for the lower speed, indicated as the 4-pole speed, while Figure 12 shows the connections for the higher speed indicated as the 2-pole speed. In Figure 10 is shown a pole changer with connected contacts 27, 28 and 29, adapted to connect the coils 1 and 10, 6 and 9, and 2 and 5 respectively, to the three-phase terminals R, S, and T, while connected contacts 33 join together the middle mesh points 16, 17 and 18 in star. The winding thus becomes a parallel double star winding when the contacts above 4P in the pole changer are in operation and when the connections are made as in Figure 11. When the contacts above 2P in the pole changer are in operation on the other hand, coils 9 and 10, 1 and 2, 5 and 6, are connected by pairs of contacts 30, 31, 32, while other pairs of contacts connect the three-phase supply terminals R, S, T, to the tappings 13, 14, 15, respectively, and the result in this case is a 2-pole field, as in Figure 12. The crosses and dots in the circles representing the bars in Figure 10 indicate the flow of currents for 4-pole working, while the crosses and dots outside the bars indicate the flow of currents for 2-pole working.

Figure 13:
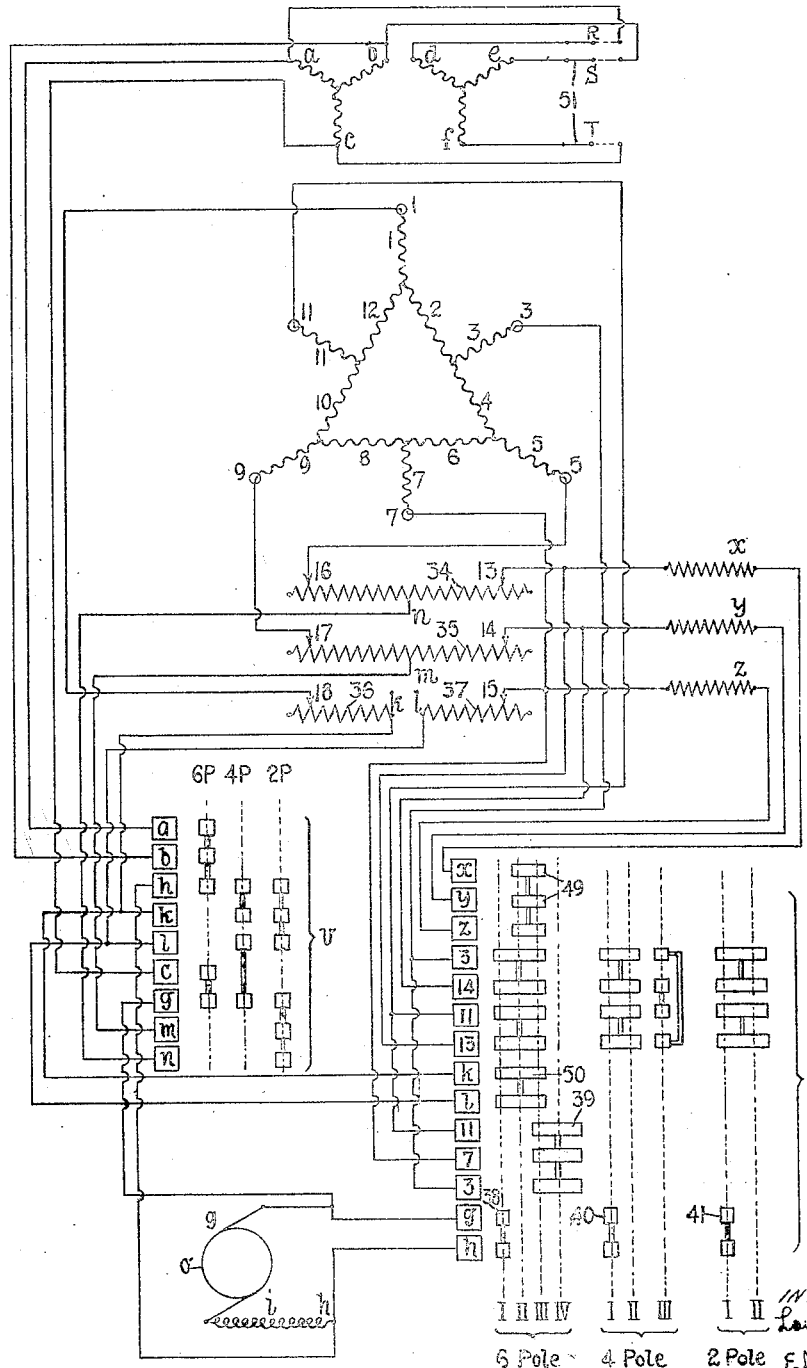
Figure 13 is a diagram of the rotor and stator windings, and of a change pole switch and a starting and synchronizing controller, illustrating the connections for enabling the machine to operate as a synchronous machine at each of the speeds corresponding to the basic pole numbers, and also at the cascade speed.

Referring now to Figure 13, a complete diagram will be seen of a machine adapted to operate as a synchronous motor at three speeds, assumed to be 6-pole (cascade), 4-pole and 2-pole speeds respectively. The rotor winding is indicated by a diagram corresponding to that of Figure 2, with its coils numbered 1–12, while the stator is indicated by two star connected windings having terminals $a$, $b$, $c$ and $d$, $e$, $f$ respectively. For alternating current excitation the stator windings are adapted to be connected to the terminals of a three-phase supply R, S, T, through change-over switches 51, whereby either the 4-pole or the 2-pole winding can be excited by alternating current, or one can be excited by A. C. through terminals $d$, $e$, $f$, to produce the one basic pole number (the 4-pole field), while the other winding is excited by direct current from the source $o$ to produce the other basic field (2-pole field) for synchronous cascade operation (at 6-pole speed).

The method of starting and synchronizing is an adaptation of that set forth in British patent specification No. 124,018 or United States Patent No. 1328520. Resistances 34, 35, 36 and 37 are used for starting purposes, the last two constituting a divided resistance with terminals $k$ and $l$, which can be connected or not by the controller or pole-changer as required. The mid-points of resistances 34, 35, have terminals $n$, $m$, connected to contacts in the pole changer $v$. The pairs of brushes 16 and 13 on resistance 34, 17 and 14 on resistance 35, and 18 and 15 on resistances 36, 37, are arranged to be brought together over the contacts of the resistances during starting when the machine will be operating as an induction motor. Resistances $x$, $y$ and $z$ connected to brushes 13, 14 and 15 serve the same purpose as the resistances numbered 20 in Figure 1 of British patent specification No. 124,018, when synchronizing at cascade speed (6-pole speed).

In the pole changer $v$, the contacts in columns marked 6P, 4P and 2P respectively are those which are in use when the pole changer is set for 6-pole cascade working, for 4-pole working, and for 2-pole working. For 6-pole working it will be seen that terminals $a$ and $b$ of the stator are connected to terminal $h$ of the D. C. generator $o$, while terminal $c$ is connected to terminal $g$ of the generator. The starting and synchronizing controller $w$ has sets of contacts in columns grouped above the designations 6-pole, 4-pole and 2-pole for use in starting and synchronizing at those pole numbers. The column for 6-pole starting has connected contacts 38 which in position I short-circuit the generator terminals $g$, $h$, so that at first it can develop no E. M. F. In position I also terminal 3 of the rotor is connected to brush 14 on resistance 35, and terminal 11 to brush 13; terminal 7 is permanently connected to brush 15. The two resistances 36, 37, are bridged together between $k$ and $l$ also in the first starting position of controller $w$ by the contacts 50. The machine now starts as an induction motor, and the brushes 16 and 13, 17 and 14, 18 and 15, are moved towards the centre until the 6-pole speed is approximately attained or slightly exceeded if preferred. Then the controller is moved to position II, in which the contacts 38 open the short circuit on the generator $o$, and this now produces the synchronizing 2-pole field in the stator winding $a$, $b$, $c$. In the second position of the controller the slip rings of coils 3, 7 and 11, are connected by contacts 49 through the resistances $x$, $y$, $z$. In position III, which is only transitory, the slip rings 3, 7 and 11, are short circuited by contacts 39, and when position IV is reached all other controller connections are opened, leaving the slip rings 3, 7, 11, short-circuited. The resistances 36, 37 are disconnected between $k$ and $l$, which breaks the connection between slip rings 1 and 7, while the connections of slip rings 3 to brush 14, and 11 to brush 13 have been opened, so that all the starting interconnections have been opened, leaving the slip rings of coils 1, 5 and 9 open-circuited. The starting for synchronous speed is therefore substantially the same as is described in British patent specification No. 124,018 or United States specification No. 1328520.

For 4-pole working, the contacts of the pole changer $v$ in column 4P connect generator terminal $g$ to terminal $l$ of resistance 37, and generator terminal $h$ to $k$ of resistance 36. As brush 15 is connected to slip ring 7 while brush 18 is connected to slip ring 1, the opposite terminal points of the rotor winding 7 and 1, are now connected to the terminals of the generator $o$. In the controller $w$, the contacts in columns I, II and III above the designation "4-pole" are brought into operation successively. At first the generator terminals $g$, $h$, are short-circuited by contacts 40, while slip ring 5 is connected to brush 14, and slip ring 11 to brush 13. Slip ring 7 is already connected to brush 15, while the slip ring 9 is connected to brush 17, 5 to 16, and 1 to 18. The flow of currents in the rotor is thus in accordance with Figures 1 and 4, except that resistances 36, 37, are connected between the slip rings 7 and 1, while instead of 3 being connected to 11 and 5 to 9, the slip rings 3 and 9 are interconnected through resistance 35, and 5 and 11 through resistances 34. These resistances are cut out in speeding up. In position II, the short-circuit on the generator $o$ is opened so that it excites the rotor with direct current producing the 4-pole field, but the induction motor effect is still operative as the D. C. generator is connected between terminals 1 and 7 of the rotor. The machine therefore pulls up steadily towards the synchronous speed. When this is reached the controller is moved to position III. This only results in slip rings 3 and 11 being changed over in their connections to brushes 13 and 14, so that as the resistances have been cut out by moving all the brushes toward the centre, the circuits become identical with those of Figures 5 and 6, 3 being connected to 5, and 11 to 9.

For 2-pole operation, the pole changer in column 2P has one set of contacts which connect $k$ and $l$ and unite them to generator terminal $h$, while the other set of contacts connect terminal $g$ to the mid-points $m$ and $n$ of resistances 35, 34. In the controller $w$ the connections are the same as for 4-pole starting, except that only positions I and II are needed, as the 2-pole induction motor connections are the same as the synchronous connections. On moving from I to II the generator o is brought into circuit after the short-circuit has been broken by contacts 41 moving out of action. Slip rings 1 and 7 are connected to one terminal h of the generator through resistances 36, 37, which are cut out during starting, while all the other slip rings are connected in parallel to terminal g through resistances 34, 35, which are also cut out during starting.

Figure 14:
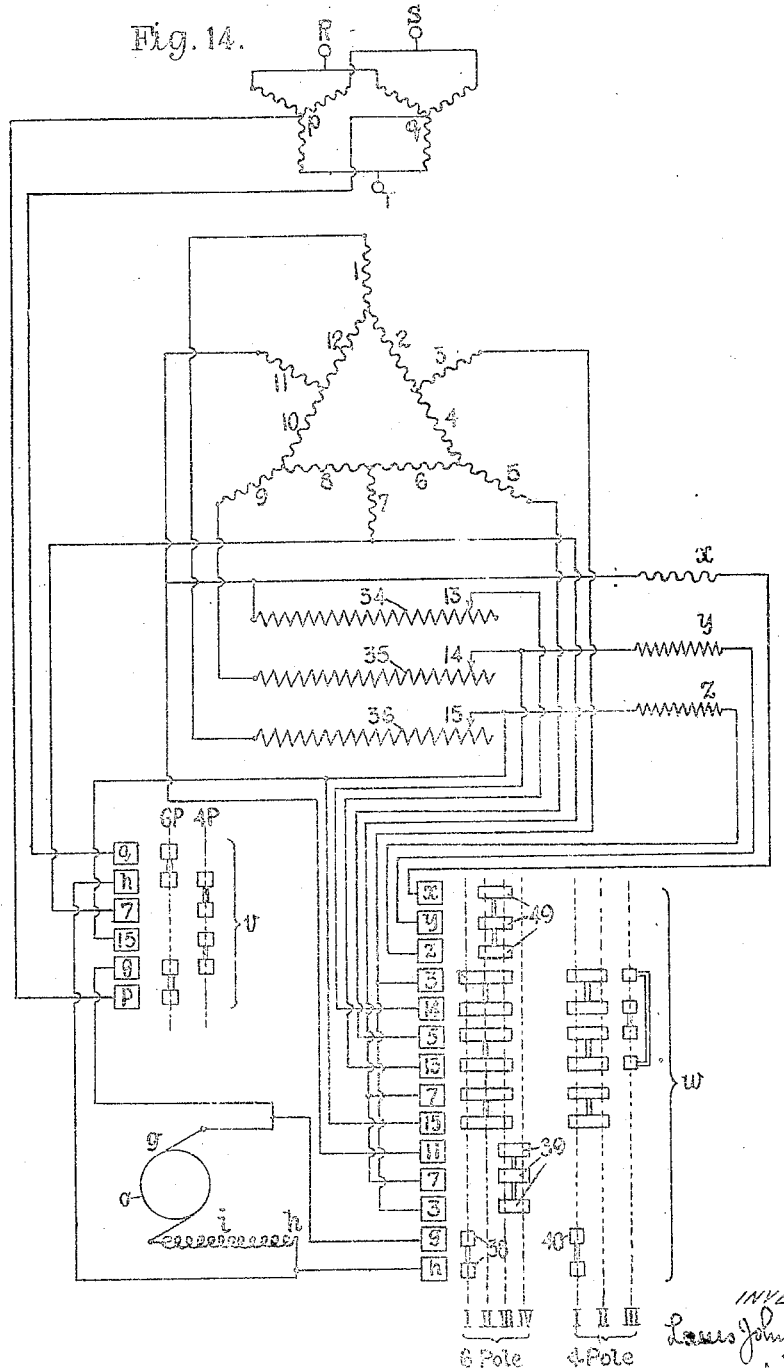
Figure 14 is a similar diagram of a machine and its connections arranged to operate at the cascade speed and the speed corresponding to one of the basic pole numbers.

When the machine is required to operate at the cascade speed and one other speed only, the arrangement can be simplified as in Figure 14. Firstly, the windings of the stator may be of the type set forth in British patent specification No. 24838 of 1914 or 15113 of 1915, and such windings are indicated diagrammatically at the top of Figure 14. The three-phase windings receive current through terminals R, S, T, while direct current for producing the other basic pole number is introduced at the neutral points p, q of the 4-pole winding. The pole changer has fewer contacts, and only three resistances 34, 35, 36, are needed, each of which has one end permanently connected to a slip ring. In the figure the connections have been changed so as to illustrate the connection of slip rings 3 to 11 and 5 to 9 for damping purposes as in Figures 1 and 4. Slip ring 11 is now connected to the left-hand end of resistance 34, slip ring 9 to 35, and slip ring 1 to 36. The other slip rings 3, 5 and 7 are connected to contacts in the controller w for varying their connections to the brushes 13, 14 and 15. As the synchronizing resistance x must still be connected to 11, it is not now connected to brush 13 but directly to slip rings 11. In the pole changer v in the 6-pole position, the generator terminals g, h are connected to the star points p, q, in the stator winding. The starting and synchronizing contacts in columns I to IV in the 6-pole portion of the controller w make the same circuit connections as those made in the corresponding columns of the controller in Figure 13, except that where contacts k and l were connected in Figure 13 to complete the circuit of slip rings 1 and 7, the connection of slip ring 7 to brush 15 is closed for this purpose in Figure 14. For 4-pole starting, the change pole switch is put to position 4P in which generator terminal h is connected to slip ring 7 and g is connected to slip ring 1 through 15 and resistance 36, which is cut out in starting. The controller w in the 4-pole starting positions first short circuits generator terminals g and h as before, and connects the slip rings 3, 5 and 7 to brushes 14, 13 and 15, and so to the resistances connected to the opposite terminals 9, 11 and 1 respectively to the winding. These resistances 34, 35 and 36 are cut out by moving the brushes 13, 14, 15 to the left as the machine speeds up, and synchronous speed is thus nearly attained; the controller is now moved to position II in the 4-pole column, throwing into circuit the generator o as the short circuit through contacts 40 is broken. The machine now comes into synchronism, and finally when the controller is moved to position III slip ring 3 is connected directly through brush 13 to 11, and slip ring 5 through brush 14 to 9. This completes the connections corresponding to Figures 1 and 4.

Figure 15:
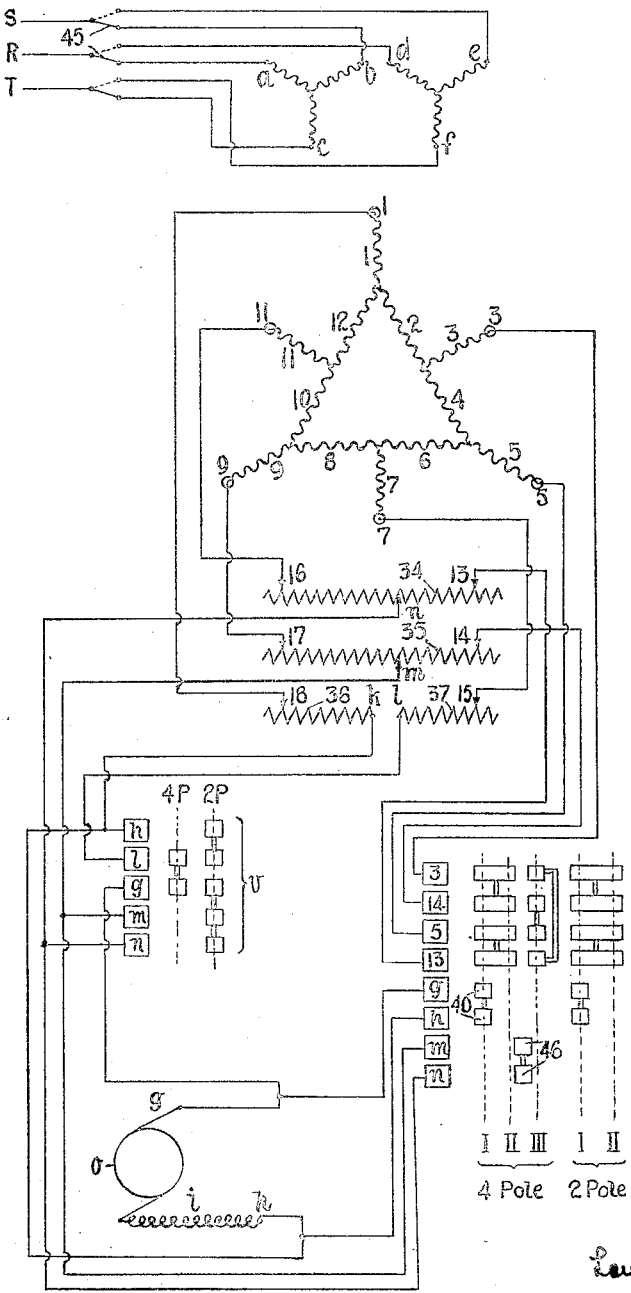
Figure 15 is a similar diagram of a machine and its connections arranged to operate at the speeds corresponding to the basic pole numbers, but not at the cascade speed.

When the machine is required to operate at the two basic pole numbers only, the controller is much simplified as indicated in Figure 15. The stator winding may be assumed to be of the type shown in Figures 10 to 12, but for convenience two separate windings are shown, adapted to be connected through change-over switches 45 to the A. C. supply terminals R, S, T. Divided resistances 36, 37 with terminals k, l, have again to be used as in Figure 13, but other connections are simplified. Resistance terminal k is connected permanently to the generator terminal h. The pole changer merely requires two contacts in the 4P column to connect resistance terminal l to the generator terminal g. The starting and synchronizing contacts in controller w may make the same connections in 4-pole starting as in Figure 14, but an additional pair of connected contacts 46 is provided for connecting the midpoints m and n of resistances 35, 34, in transition from position II to III, so that there may be no complete break in changing over the slip ring connections. The 2-pole connections are the same as in Figure 13, except that in the pole changer, as k and h are already connected, one contact is saved.

Although the invention has been described as if the windings which are connected in cascade or to which direct current is supplied for synchronous working with the lower pole numbers, were to be the rotor windings and to have their terminals connected to slip rings, yet it will be apparent that such windings can be used on the stationary part if preferred, while the rotating part of a machine carries the windings hereinbefore assumed to be on the stator. Further, although it has been assumed that with the windings arranged as hereinbefore described the rotor will always have slip rings which will allow of the interconnection of the terminals of the windings in different ways as hereinbefore described, yet it will be understood that if a machine is not required to run at all possible speeds, it is not essential to take out all the terminals to slip rings, but some of them can be arranged to be interconnected through internal resistances which can be cut out by arrangements of a known type during the running of the machine.

In conclusion, it must be clearly understood that though 2, 4 and 6 poles have been referred to in the examples, the basic pole numbers used in practice will generally be 4 and 8, with a cascade speed corresponding to 12 poles if required, or other larger pole numbers as already explained. Machines constructed as hereinbefore set forth can be used as generators instead of motors, in which case of course some of the slip rings whose connections are changed for starting as a motor will not be needed because the generator will be driven positively. In a generator for example to operate at the 4-pole and 2-pole frequencies, only three slip rings will be needed, viz. numbers 1 and 7, and a third slip ring interconnecting all of the terminals 3, 5, 9 and 11. Then at the 4-pole frequency the terminals of the D. C. generator are connected to 1 and 7, and the rotor circuits correspond to Figure 5 with 22 and 23 connected. At 2-pole frequency the generator is connected at one terminal to both 1 and 7, and at the other to the third slip ring. The terms "rotor winding" and "stator winding" are convenient to distinguish the two windings on the separate parts of the machine, and are used in the claims which follow to designate the windings hereinbefore referred to by those terms, but it must be understood that if the stationary and rotating parts of the machine are interchanged, the terms are still intended to designate the same windings. The windings on the stator may be two-phase instead of three-phase if required in any case, and other modifications of a similar character can be made without departing from the scope of the invention.

For the generator o I prefer to employ a series-wound machine with interpoles but any other suitable type of generator may be used.

Having thus described my invention what I claim as new and desire to secure by Letters Patent is:—

1. A dynamo-electric machine having windings on the stationary part adapted to produce fields of two different pole numbers, and windings on the revolvable part also adapted to produce fields of said two different pole numbers, the windings on one of said parts being of a type wherein currents flow through some of the same coils with different terminal connections for producing fields of the two different pole numbers, in combination with means for supplying direct current to the windings on the last mentioned portion of the machine in such manner as to produce fields of either of the two said pole numbers.

2. A dynamo-electric machine having windings on one part thereof adapted to produce fields of two different pole numbers, and windings on the other part thereof adapted to produce a field of one of said pole numbers when direct current is passed through such windings through terminals which are at opposite points in the winding, and adapted to produce a field of the other said pole number when the before-mentioned opposite terminal points are connected in parallel to one terminal of a source of supply while other terminal points in said winding are connected in parallel to the other terminal of a source of supply, in combination with means for supplying direct current to said last-mentioned windings with either of the forms of connections herein set forth.

3. A dynamo-electric machine adapted to operate as a synchronous machine at a plurality of different speeds, said machine having windings on one part thereof adapted to produce fields of two different pole numbers, and having windings on the other part thereof such that currents flowing in part through the same coils can produce fields of said different pole numbers, in combination with means for supplying direct current to the windings aforesaid in either of two different circuit paths such that fields of either of the two pole numbers can be produced.

4. A dynamo-electric machine adapted to operate as a synchronous machine at a plurality of different speeds, said machine having windings on one part thereof adapted to produce fields of two different pole numbers, and having windings on the other part thereof such that current flowing in part through the same coils can produce fields of said different pole numbers, in combination with means for supplying direct current to the windings on the second-mentioned part of said machine in such manner as to produce a field of one of said pole numbers, and means for supplying direct current to the windings on the first-mentioned part of said machine in such manner as to produce a field of one of said pole numbers while connecting the windings on the second-mentioned part of said machine in such manner as to act in cascade.

5. A dynamo-electric machine adapted to operate as a synchronous machine at a plurality of different speeds, said machine having windings on one part thereof adapted to produce fields of two different pole numbers, and having windings on the other part thereof such that currents flowing in part through the same coils can produce fields of said different pole numbers, in combination with means for supplying direct current to the windings on the second-mentioned part of said machine in such manner as to produce a field of one of said pole numbers, or in such manner as to produce a field of the other of said pole numbers, and means for supplying direct current to the windings on the first-mentioned part of said machine in such manner as to produce a field of one of said pole numbers while connecting the windings on the second-mentioned part of said machine in such manner as to act in cascade.

6. A dynamo-electric machine having windings on the one part thereof adapted to produce fields of two different pole numbers, and windings on the other part thereof comprising six coils connected to terminals, with six other coils interconnecting in mesh the inner ends of said first six coils, in combination with means for supplying direct current to the windings on the second-mentioned portion of said machine in such manner as to produce a field of one of said pole numbers.

7. A dynamo-electric machine having windings on the one part thereof adapted to produce fields of two different pole numbers, and windings on the other part thereof comprising six coils connected to terminals, with six other coils interconnecting in mesh the inner ends of said first six coils, in combination with means for supplying direct current to the windings on the second-mentioned portion of said machine in such manner as to produce a field of one of said pole numbers, and means for supplying direct current to the windings on the first-mentioned portion of said machine in such manner as to produce a field of one of said pole numbers while connecting the windings on the other portion of the machine so as to operate in cascade.

8. A dynamo-electric machine having windings on the one part thereof adapted to produce fields of two different pole numbers, and windings on the other part thereof comprising six coils connected to terminals, with six other coils interconnecting in mesh the inner ends of said first six coils, in combination with means for supplying direct current to the windings on the second-mentioned portion of said machine in such a maner as to produce fields of either of said pole numbers.

9. A dynamo-electric machine adapted for synchronous working at a plurality of different speeds, said machine comprising a stator bearing windings adapted to produce fields of two different pole numbers, and a rotor bearing windings adapted to produce fields of two different pole numbers, said rotor windings being of a type wherein currents can flow through the coils thereof in such manner as to produce two fields of different pole numbers in cascade, in combination with means for supplying direct current to the windings on said rotor in either of two different ways adapted to produce the fields of the respective pole numbers.

10. A dynamo-electric machine adapted for synchronous working at a plurality of different speeds, said machine comprising a stator bearing windings adapted to produce fields of two different pole numbers, and a rotor bearing windings adapted to produce fields of two different pole numbers, said rotor windings being of a type wherein currents can flow through the coils thereof in such manner as to produce two fields of different pole numbers in cascade, in combination with means for supplying direct current to the windings on said rotor in either of two different ways adapted to produce the fields of the respective pole numbers, and means for supplying direct current to a portion of said stator windings in such manner as to produce a field of one of said pole numbers, while connecting said rotor windings in the manner required for operating in cascade.

11. A dynamo-electric machine having windings on the one part thereof adapted to produce fields of two different pole numbers, and windings on the other part thereof comprising six coils connected to terminals, with six other coils interconnecting in mesh the inner ends of said first six coils, in combination with means for supplying direct current to the windings on the second-mentioned portion of said machine in such manner as to produce a field of one of said pole numbers, and means for interconnecting other terminals of said last mentioned windings in such manner as to provide local circuit paths in said windings through which currents can flow for damping purposes and for maintaining synchronism.

12. A dynamo-electric machine adapted for synchronous working, having windings on one part thereof adapted to operate with alternating current supplied thereto in such manner as to produce fields of either of two pole numbers, and having windings on the other part thereof adapted to operate in cascade with the windings on the first mentioned part in such manner as to produce fields of the same two pole numbers, in combination with starting and controlling means adapted to connect the windings on the second mentioned part of said machine so as to operate with induced currents for starting purposes at one of the said pole numbers, and adapted to change over the connections of said windings so as to admit of the flow of direct current therethrough for a synchronizing and maintaining synchronous operation at either of the two pole numbers aforesaid.

13. A dynamo-electric machine having windings on one part thereof adapted to receive alternating current producing a rotating field of one number of poles and adapted to receive current producing a field of another number of poles and having windings on the other part thereof adapted to permit of the flow of currents producing either of said numbers of poles, in combination with means for connecting said last mentioned windings in such manner as to allow of the flow of induced currents producing fields of either of said pole numbers, and means for supplying direct current to said last mentioned windings in such manner as to produce a field of one of said pole numbers.

14. A dynamo-electric machine having windings on one part thereof adapted to receive alternating current producing a rotating field of one number of poles and adapted to receive current producing a field of another number of poles and having windings on the other part thereof adapted to permit of the flow of currents producing either of said numbers of poles, in combination with means for connecting said last mentioned windings in such manner as to allow of the flow of induced currents producing fields of either of said pole numbers, and means for supplying direct current to said last mentioned windings in such manner as to produce either a field of one of said pole numbers or a field of the other of said pole numbers.

15. A dynamo-electric machine having windings on one part thereof adapted to receive alternating current producing a rotating field of one number of poles and adapted to receive alternating current or direct current as may be required producing a field of another number of poles, and having windings on the other part thereof adapted to permit of the flow of currents producing either of said numbers of poles, in combination with means for connecting said last mentioned windings in such manner as to allow of the flow of induced currents producing fields of either of said pole numbers, and means for supplying direct current to said last mentioned windings in such manner as to produce a field of one of said pole numbers, whereby the machine is enabled to operate as a synchronous machine at either of two different pole numbers, and to be started as an induction motor prior to synchronizing.

LOUIS JOHN HUNT.